United States Patent
Mak et al.

(10) Patent No.: US 7,705,939 B2
(45) Date of Patent: Apr. 27, 2010

(54) TRANSFLECTIVE LIQUID CRYSTAL DISPLAY

(75) Inventors: Hin Yu Mak, Kowloon (HK); Vladimir Grigorievich Chigrinov, Kowloon (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 315 days.

(21) Appl. No.: 11/755,355

(22) Filed: May 30, 2007

(65) Prior Publication Data
US 2008/0002107 A1   Jan. 3, 2008

Related U.S. Application Data

(60) Provisional application No. 60/809,355, filed on May 31, 2006.

(51) Int. Cl.
*G02F 1/1335* (2006.01)
(52) U.S. Cl. ........................................ 349/114
(58) Field of Classification Search .................. None
See application file for complete search history.

(56) References Cited

U.S. PATENT DOCUMENTS

| | | | |
|---|---|---|---|
| 4,443,065 A | 4/1984 | Funada et al. | |
| 5,287,207 A | 2/1994 | Mulkens et al. | |
| 6,801,281 B2 | 10/2004 | Huang et al. | |
| 6,989,878 B2 | 1/2006 | Choi et al. | |
| 7,015,997 B2 | 3/2006 | Choi et al. | |
| 2003/0202139 A1 | 10/2003 | Choi et al. | |
| 2003/0206257 A1 | 11/2003 | Choi et al. | |
| 2003/0210366 A1 | 11/2003 | Huang et al. | |
| 2005/0151902 A1 | 7/2005 | Wang et al. | |
| 2005/0243265 A1* | 11/2005 | Winlow et al. | 349/178 |
| 2005/0248697 A1 | 11/2005 | Ukawa | |
| 2006/0098144 A1 | 5/2006 | Chang et al. | |

* cited by examiner

*Primary Examiner*—Sung H Pak
(74) *Attorney, Agent, or Firm*—Schwabe Williamson & Wyatt

(57) ABSTRACT

A transflective liquid crystal display having at least one reflective region 122 and at least one transmissive region 121. The display comprises a first polarizer 5, a second polarizer 100 opposing the first polarizer 5, two twisted nematic liquid crystal layers 30, 60 between said first and second polarizers 5, 100 and a reflector 110 for reflecting light passing though the reflective region 122 of the display. The twisted nematic liquid crystal layers 30, 60 have opposite twist directions to each other. The second twisted nematic liquid crystal layer 60 improves the contrast of the display. The display may have a double cell arrangement, in which case there may be a single cell gap or a double cell gap. Alternatively, the display may have a single cell arrangement in which case the second twisted nematic liquid crystal layer is a temperature dependent retardation film 65.

23 Claims, 5 Drawing Sheets

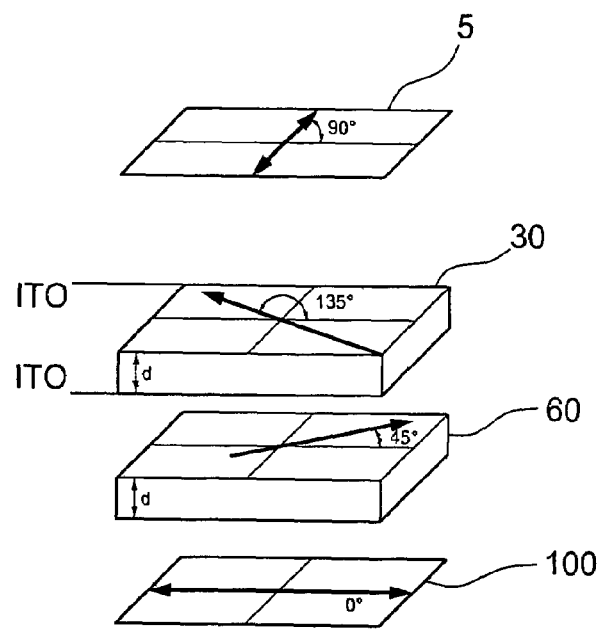
Fig.7
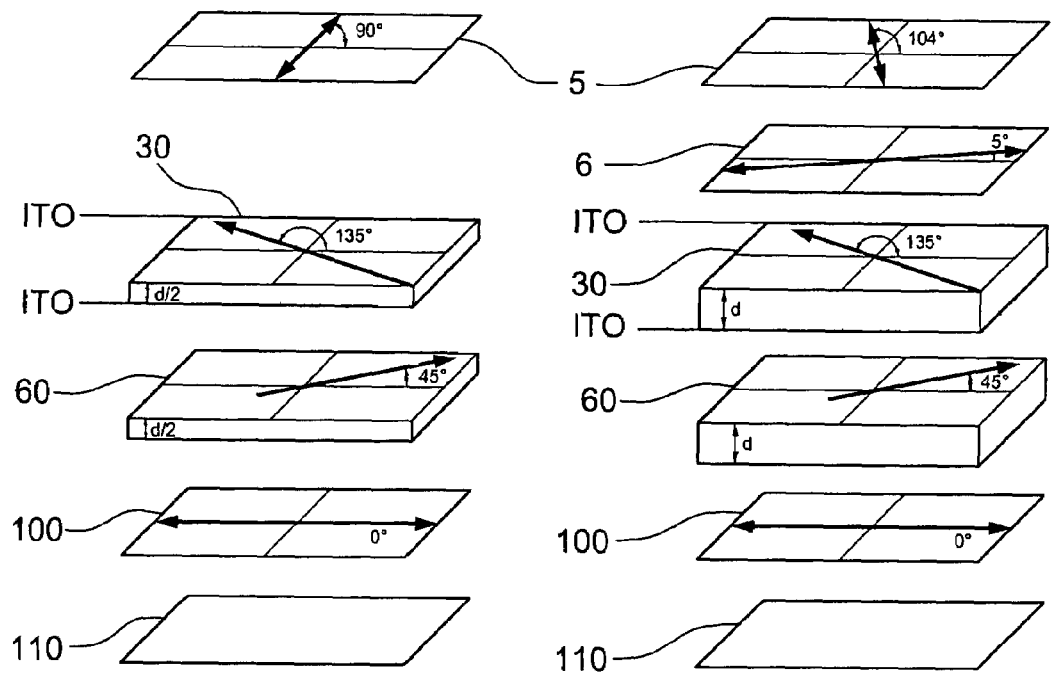

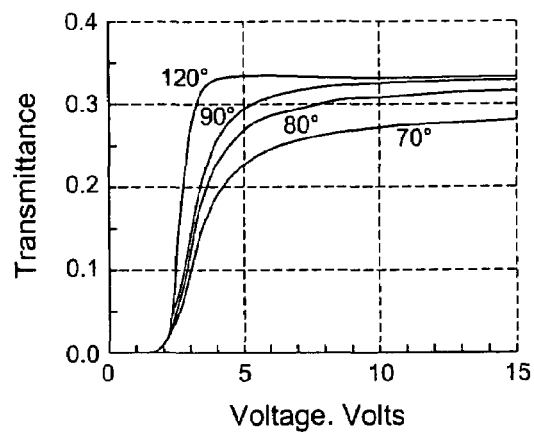
Fig.10
| | Source | 90° | 80° | 70° | 60° | 50° |
|---|---|---|---|---|---|---|
| x | 0.31 | 0.3021 | 0.3135 | 0.3208 | 0.3252 | 0.3574 |
| y | 0.33 | 0.3461 | 0.3536 | 0.3596 | 0.3605 | 0.3791 |
| Δx | 0 | 0.0079 | 0.0035 | 0.0108 | 0.0142 | 0.0474 |
| Δy | 0 | 0.0161 | 0.0236 | 0.0296 | 0.0305 | 0.0491 |
Fig.11
| | 5a) | 5b) | 5c) | 5d) | 5e) |
|---|---|---|---|---|---|
| Contrast | 297 | 25 | 25 | 120 | 13 |
Fig.12
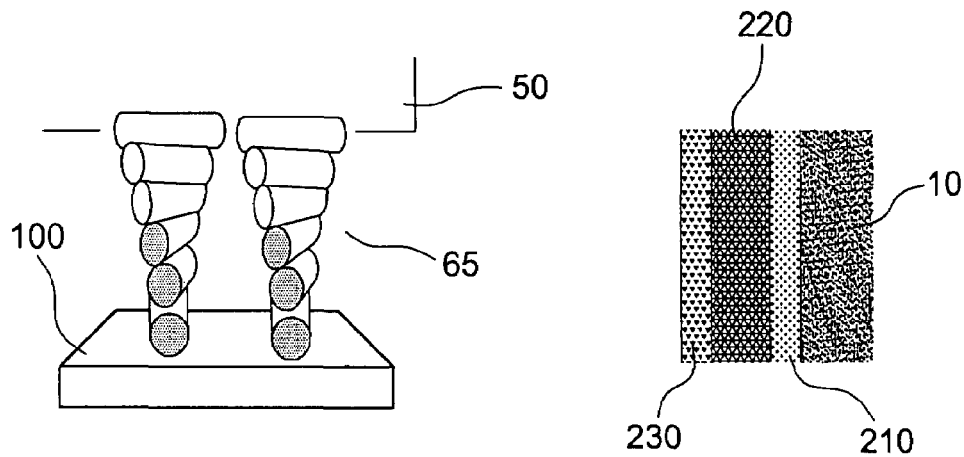
Fig.13  Fig.14

TRANSFLECTIVE LIQUID CRYSTAL DISPLAY

This application claims benefit of U.S. Provisional Application No. 60/809,355, filed May 31, 2006 (which is hereby incorporated by reference).

FIELD OF THE INVENTION

The present invention relates to a transflective liquid crystal display.

BACKGROUND TO THE INVENTION

Liquid crystal display types are divided into three kinds: a transmissive LCD which uses a backlight to provide illumination, a reflective LCD which reflects ambient light, and a transflective LCD which uses both a backlight and ambient light. A transmissive LCD is an ineffective light converter and only transmits about 3% to 8% of light from its backlight. Therefore transmissive LCDs require a backlight device having high brightness, leading to high power consumption. Reflective LCDs use ambient light for imaging, thus saving power consumption. However, although reflective LCDs can be used during the daytime, or in environments where external light exists, they cannot be used at night or under poor ambient lighting conditions.

Furthermore, the market demand for outdoor LCD applications is expanding. LCDs are needed for mobile navigator/video systems, PDAs, personal organizers, Tablet PCs, notebook computers, and Kiosk displays etc. Regular transmissive LCDs are of limited use for these applications because they are very difficult to read under strong ambient light. Therefore high brightness LCDs are sometimes used for outdoor applications. However, due to the high power backlight, high brightness LCDs suffer from high power consumption, excessive heat generation, increased dimensions, electrical circuit alterations, and shortened LCD lifetime.

In order to overcome the above drawbacks of transmissive and reflective LCDs, transflective LCDs have been developed to allow good legibility under any ambient light environment. In most transflective LCD displays each pixel is divided into reflective and transmissive sub-pixels. The transmissive sub-pixel does not have a reflector so it allows light from the backlight to pass through it and operates in transmission mode. Meanwhile, the reflective sub-pixel has a reflector for reflecting ambient light so that it can operate in reflective mode. Transflective LCDs operate well under all light conditions.

U.S. Pat. No. 7,015,997 teaches a method of producing a transflective liquid crystal display with a single cell gap, by partial switching of the pixels of approximately 45 degrees in the reflective pixel region of the single cell gap. This is achieved by applying fringing fields, generated by a discontinuous electrode, to the molecules in the reflective pixel region of the cell gap.

U.S. Pat. No. 6,989,878 discloses a transflective twisted nematic liquid crystal display with cell gap spacing in the transmission portion of the transflective LCD being approximately triple the cell gap spacing in the reflection portion of the transflective LCD.

U.S. Pat. No. 6,801,281 discloses a single cell gap transflective liquid crystal display with a slant reflector built on the path of the backlight. Light from the backlight thus traverses the reflective pixel portion twice and thereby follows a path similar to that of the ambient light.

US Patent Application 20060098114 disclose an array substrate for a transflective liquid crystal display device with a discontinuous transmissive electrode having a plurality of transmissive electrode portions and a reflector comprising a plurality of discontinuous reflector portions, the transmissive electrode portions and reflector portions are alternately disposed in order to optimise the light efficiency in both reflection and transmission modes.

US Patent Application 20050248697 discloses an LCD assembly comprising a backlight an liquid crystal panel and an optical element. The liquid crystal panel comprises a liquid crystal layer between two polarizers. The optical element comprises a liquid crystal layer between two glass substrates, but no polarizers. The optical element may be switched between a reflective mode in which it reflects light and a transmissive mode in which it transmits light. In this way the assembly may be switched between reflective and transmissive modes, but the pixels are not split into reflective and transmissive sub-pixels. Rather in the reflective mode each pixel acts in an entirely reflective manner and in the transmissive mode each pixel acts in an entirely transmissive manner. In this way it is hoped to maximize the brightness of the display.

US Patent Application 20050151902 disclose a transflective liquid crystal display with a single LC cell gap. A liquid crystal cell wall structure between the upper and lower substrates creates a first channel at reflective region and a second channel at transmissive region. The first and second channels may be filled with different liquid crystal materials. The first an second channels do not overly each other, so in general light passing through the display either passes through the first liquid crystal material (in the reflective region) or the second liquid crystal material (in the transmissive region) but not both.

SUMMARY OF THE INVENTION

The present invention aims to provide a transflective liquid crystal display with one or more of the following properties: good contrast, a wide viewing angle and/or light efficiency in both reflective and transmissive modes.

A first aspect of the invention provides a transflective liquid crystal display having at least one reflective region and at least one transmissive region, the display comprising:
 a first polarizer;
 a second polarizer opposing the first polarizer;
 two twisted nematic liquid crystal layers between said first and second polarizers; and
 a reflector for reflecting light passing through the reflective region of the display;
 wherein said twisted nematic liquid crystal layers have opposite twist directions to each other.

For example, the first twisted nematic liquid crystal (TN LC) layer may have right handed twist while the second TN LC layer may left handed twist. Alternatively the first TN LC layer may have left handed twist while the second TN LC layer has night handed twist. As the two TN LC layers which have opposite twist directions (also known as opposite twist sense), the contrast of the display is improved.

The first and second twisted nematic liquid crystal (TN LC) layers should overlie each other so that light passing between the first and second polarizers passes through both TN LC layers.

There are one or more reflectors for reflecting light passing through the reflective region(s) of the display. Preferably, the reflector(s) extend across only the reflective region(s), not the transmissive regions of the display. Preferably the reflector or reflectors are positioned behind the first and second TN LC layers (i.e. the first and second TN LC layers are between the first polarizer and the reflector). In the preferred embodiment the reflector(s) are positioned behind the second polarizer.

Preferably a first one of said twisted nematic liquid crystal layers is an active layer. Preferably a second one of said twisted nematic liquid crystal layers is a passive layer. An active layer is a layer whose twist angle (of the liquid crystals) can be varied by application of a voltage, e.g. through a pair of electrodes; a passive layer is a layer which does not have electrodes for varying the twist of the liquid crystals.

Preferably the active TN LC layer is the layer positioned nearer the front of the display; for example when the first layer is the layer closest /adjacent the first (front) polarizer and second layer is layer closest/adjacent the second (rear) polarizer, it is preferred that the first TN LC layer is the active layer.

Preferably the twist angles of each of TN LC layers are substantially the same. By substantially the same it is meant that the twist angles are the same or that they differ by no more than 3 degrees. E.g. if the first TN LC layer has a twist angle of 60 degrees, the second TN LC layer could have a twist angle of 57 degrees or 63 degrees.

Preferably the twist angles of the two twisted nematic LC layers are within the range from 50 degrees to 120 degrees, more preferably 80 to 100 degrees, even more preferably 85 to 95 degrees and in one embodiment 90 degrees. These twist angles have been found to give good contrast to the display. As mentioned above, the direction of twist (i.e. the sign of the twist angle) in the two layers is opposite to each other.

Preferably the retardation values of the two TN LC layers are similar. By similar it is meant that the retardation values of the two TN LC layers do not differ from each other by more 50 nm. Most preferably the retardation values of the two TN LC layers are the same. This helps to improve the contrast of the display.

Preferably the rubbing directions of said two twisted nematic LC layers are perpendicular to each other or within 3 degrees of the perpendicular; i.e. the two TN LC layers should have rubbing directions that are between 87 to 93 degrees to each other (inclusive), most preferably at 90 degrees to each other. This helps to improve the contrast of the display.

The active TN LC layer may have one or more electrodes for controlling the twist angle of the liquid crystals in the layer. For example, the electrodes may be on substrates on either side of the TN LC layer. The electrodes may be formed of ITO (Indium Tin Oxide), zinc oxide series materials, titanium oxide series materials, indium oxide-zinc oxide series materials, Ga doped zinc oxide series materials, p-type oxide materials, or any other suitable materials, as will be apparent to a person skilled in the art.

Preferably the LCD is a colour display. It may have red, green and blue pixels, each with their own transmissive and reflective sub-pixels. Preferably the display is arranged such that the reflective and transmissive sub-pixels have the same grayscale/colour grayscale. By grayscale/colour grayscale it is meant that the reflective and transmissive sub-pixels are controlled by the same control voltage so that when the reflective sub-pixel is at its maximum reflectivity, the transmissive sub-pixel is at its maximum transmissivity. This may be achieved by arranging the reflective and transmissive sub-pixels to retard light passing through them by the same amount (e.g. by using a double cell gap structure or a patterned polarizer as discussed in more detail below).

Preferably both the first and second twisted nematic liquid crystal layers are cells, i.e. the display has a double cell structure. A cell comprises a TN LC layer attached to a substrate, such as glass, in a known manner and at a particular rubbing angle. Each LC cell usually comprises first and second substrates and a liquid crystal layer between the substrates. Therefore a double cell LCD will usually have first, second and third substrates with LC layers between the first and second and second and third substrates. Preferably the thickness of the first and second LC layers is the same.

Alternatively, however, the LCD may use a retardation film comprising liquid crystals, instead of one of the LC cells. This has the advantage of reducing the thickness of the display, but cannot provide the same display quality in terms of contrast etc. Preferably the retardation film is a temperature dependent retardation film so as to compensate for the active LC layer over a range of temperatures.

Thus, in some embodiments the display may have a single cell gap arrangement. A single cell gap means that the liquid crystal layers have the same thickness in both transmissive and reflective regions of the display. For example, the display may have a plurality of pixels, at least some of the pixels having a transmissive sub-pixel and a reflective sub-pixel; the transmissive and reflective sub-pixels having the liquid crystal layers of the same thickness. The single cell gap arrangement should exist in both layers, i.e. both the first and second TN LC layers have uniform thickness across the transmissive and reflective regions. A single cell gap arrangement has the advantage that it is easy to manufacture.

However, in other embodiments the display does not have a single cell gap arrangement. There are some advantages if the liquid crystal layers have a different thickness in the transmissive regions of the display compared to the reflective regions of the display. In general the phase retardation experienced by light passing through the reflective region of the display will be greater than that experienced by light passing through the transmissive region of the display because the reflected light passes through the TN LC layers twice. Therefore, by making the TN LC layers thicker in the transmissive regions than the reflective regions, the difference in phase retardation can be reduced or eliminated. The transmissive and reflective regions may be transmissive and reflective sub-pixels.

Where the LCD has LC layers of different thickness in the transmissive and reflective regions, the liquid crystal layers in the reflective regions preferably have half the thickness of the liquid crystal layers in the transmissive regions or sub-pixels of the display. This is known as a double cell-gap arrangement.

One of the first and second polarizers may be a patterned polarizer which has different angles of polarizing axes in transmissive and reflective regions. This enables the phase retardation between the reflective and transmissive regions to be equalized. A patterned polarizer is especially useful for the single cell gap arrangement which may otherwise have very different phase retardations in the reflective and transmissive regions.

Preferably the first polarizer (positioned at or near the front of the display) is the patterned polarizer.

Preferably the angles of polarizing axes in the transmissive and reflective regions are chosen to maintain the same electro-optical performance in the transmissive and reflective regions. For example the angles are chosen such that the phase retardation undergone by light passing through the reflective region and light passing through the transmissive region of the pixel is the same; or more precisely ambient light passing through the front polarizer reflected by reflector back through front polarizer experiences substantially the same phase retardation as light passing from a backlight through second and first polarizers.

A retarder, such as a quarter wave plate, may be provided in the reflective regions of the display in order to improve the contrast. The retarder may, conveniently, be positioned between the first polarizer and the first (front) one of said two TN LC layers.

The retarder may be a patterned retarder arranged for retarding light passing through the reflective regions of the display by a different amount to light passing through the transmissive regions of the display. Preferably the retarder does not retard light passing through the transmissive regions, but retards light passing through the reflective regions. This is because it has been found that a retarder helps to improve the contrast of the reflective regions, but can decrease the contrast in the transmissive regions.

A second aspect of the present invention provides a transflective liquid crystal display having at least one transmissive region and at least one reflective region;
first and second polarizers opposing each other and spanning said regions;
a first twisted nematic LC layer between said first and second polarizers, and
a reflector for reflecting light passing through said at least one reflective region;
wherein one of said first and second polarizers has a first part overlying said transmissive region and a second part overlying said reflective region, said first and second parts having different polarization axes.

As the polarizer has first and second parts, the phase retardation between the reflective and transmissive modes of the display can be made similar. This has the advantage of enabling the same control voltage to be used to achieve the same gray-scale effect (transmittance or reflectance) in both modes and may optimize the efficiency of both modes and the brightness of the display (as both modes will have maximum brightness at the same control voltage).

Preferably said one of said first and second polarizers having said first and second parts is the first polarizer, which is positioned towards the front of the display (the light emitting end of the display).

The display may have a plurality of pixels, at least some of said pixels having a transmissive region (or sub-pixel) and a reflective region (or sub-pixel). In that case the first and second polarizers preferably span all of said pixels. The first polarizer is then patterned so that parts overlying reflective regions of the display have different axes of polarization to parts overlying transmissive regions of the display.

Preferably there is a second twisted nematic LC layer between said first twisted nematic LC layer and said second polariser, wherein said first and second twisted nematic LC layers have twist directions which are opposite to each other. This improves the contrast of the display.

One of said twisted nematic LC layers is an active layer and the other may be a passive layer fixed between two substrates. This is called a double cell arrangement. Usually each layer will be fixed between a pair of substrates. The thicknesses of the first and second twisted nematic LC layers in the double-cell arrangement should be the same.

Preferably the active layer is the twisted nematic LC layer nearest to the front of the display.

Alternatively, instead of a double-cell arrangement, one of said twisted nematic LC layers may be an active layer while the other one of said twisted nematic LC layers is a retardation film comprising liquid crystals with opposite twist direction to the liquid crystals in the active layer. Preferably the retardation film is a temperature dependent retardation film, so that it can compensate for the other twisted nematic LC layer over a range of temperatures. This arrangement is called a single cell arrangement as the LCD then has a single LC cell and a LC retardation film, rather than two LC cells. This single cell arrangement has the advantage of providing a thinner display than a double cell arrangement. However, the improvement in contrast may not be quite as good.

Except where logic or the context demands otherwise, the second aspect of the invention may have any of the features of the first aspect of the invention, described above.

A third aspect of the present invention provides a double cell twisted nematic transflective liquid crystal display comprising two twisted nematic liquid crystal layers having a plurality of pixels, wherein some of said pixels are divided into reflective and transmissive sub-pixels and wherein a first one of said twisted nematic liquid crystal layers has an opposite twist direction to the second one of said twisted nematic crystal layers The reflective sub-pixels are arranged to use external light while the transmissive sub-pixels to use light from a backlight. For example, the reflective sub-pixels are operable to reflect light passing into the display, for example by a reflector positioned behind the reflective sub-pixel, while the transmissive sub-pixels being operable to transmit light from a backlight.

The display has first and second TN LC layers which overly each other, so that light passing between the first and second polarizers passes through both TN LC layers.

Preferably one of said first and second polarisers (most preferably the first polarizer) is patterned so that parts of the polarizer overlying transmissive regions of the pixels and parts of the polarizer overlying reflective regions of the pixels have different polarization axes. Alternatively the display may have a double cell gap where the thickness of the TN LC layers in the transflective sub-pixels is double the thickness in the reflective sub-pixels.

Except where logic or the context demands otherwise, the third aspect of the present invention may have any of the features of the first aspect discussed above.

BRIEF DESCRIPTION OF THE DRAWINGS

Embodiments of the present invention will now be described, by way of example only, with reference to the accompanying drawings, in which:

FIG. 7 shows the polarization axes of the polarizers and rubbing directions of the LC layers in a transmissive sub-pixel;

FIG. 8 shows the polarization axes of the polarizers and rubbing directions of the LC layers in a reflective sub-pixel;

FIG. 9 shows the polarization axes of the polarizers and rubbing directions of the LC layers in a reflective sub-pixel having a retarding film overlying the first LC layer of the reflective sub-pixel;

FIG. 10 is a graph showing the transmittance versus voltage curve for liquid crystals having different twist angles;

FIG. 11 is a table showing the color coordinates for a reflective region of a transflective lcd for different twist angles in the active TN LC layer;

FIG. 12 is a table comparing the contrast measured for single and double cell LCDs in both reflective and transflective modes;

FIG. 13 shows a temperature dependent retardation film between two substrates; and FIG. 14 shows an anti-reflection layer coated on a substrate.

DETAILED DESCRIPTION

The present invention relates to a transflective liquid crystal display (LCD) which has at least one reflective region and at least one transmissive region; preferably a plurality of reflective regions and a plurality of transmissive regions.

In the preferred embodiment, the display has a plurality of pixels and each pixel is divided into a reflective sub-pixel and a transmissive sub-pixel. However, in alternative embodiments, it would be possible for the transmissive and reflective regions to comprise one or more entire pixels, rather than sub-pixels.

Figure 1:
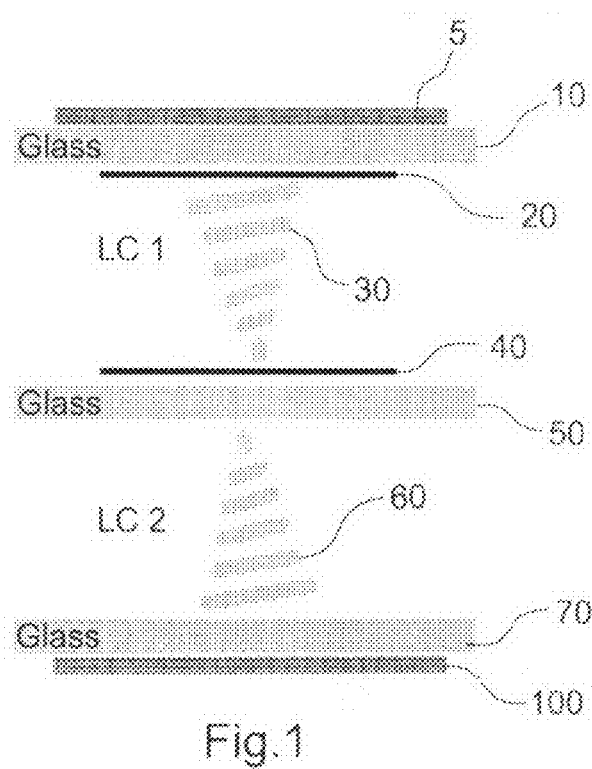
FIG. 1 shows the structure of a transmissive sub-pixel of a transflective double cell twisted nematic LCD.

FIG. 1 shows a transmissive sub-pixel of a transflective twisted nematic (TN) liquid crystal display. It comprises a first (front) polarizer 5 which is provided opposite a second (rear) polarizer 100. First and second twisted nematic liquid crystal (TN LC) layers 30, 60 are provided between the first and second polarizers 5, 100. The first and second TN LC layers overlie each other so that light passing from the first polarizer to the second polarizer must pass through both TN LC layers.

The first TN LC layer 30 is mounted between substrates 10 and 50, while the second TN LC layer is mounted between substrates 50 and 70. Any suitable type of twisted nematic liquid crystals may be used for the TN LC layers. The substrates are substantially transparent and may, for example, be made of glass.

The first TN LC layer 30 is provided between two electrodes 20, 40 which are formed on surfaces of the substrates 10, 50 and are preferably substantially transparent. The electrodes may, for example, be made from ITO (Indium Tin Oxide), zinc oxide series materials, titanium oxide series materials, indium oxide-zinc oxide series materials, Ga doped zinc oxide series materials, or p-type oxide materials. Other possibilities will be apparent to a person skilled in the art. An alignment film is formed on each electrode for attachment to liquid crystals in the first LC layer 30 in a desired alignment. The alignment film may, for example, be made from a resin material such as polyimide.

The angle of twist of the liquid crystals in the first TN LC layer 30 is controlled by the voltage applied between the two electrodes 20, 40. When no voltage is applied between the electrodes, the twist angle of the liquid crystals in the layer 30 is preferably between 50 and 120 degrees; more preferably between 80 and 100 degrees; even more preferably between 85 and 95 degrees, and in one preferred embodiment 90 degrees. When a voltage is applied between electrodes, the twist of the liquid crystals is changed according to the voltage applied and at a certain voltage the liquid crystals may be untwisted (i.e. zero twist angle) so that they do not change the phase of light passing through the layer. In this patent specification, if the angle of twist is referred to without specifying the voltage between the electrodes, then it is the angle of twist when there is no voltage between the electrodes, which is being referred to.

The display has a second TN LC layer 60 between substrates 50 and 70. Alignment films may be coated on the substrates 50 and 70 to attach to liquid crystals molecules in the layer 60 at a desired alignment. The inventors have found that addition of this second layer of TN LC improves the contrast and may also improve the viewing angle of the display.

The direction of the angle of twist of the liquid crystal molecules in the second TN LC layer 60 is opposite to that of the direction of the angle of twist of the liquid crystal molecules in the first TN LC layer 30 (when no voltage is applied to the electrodes). That is the two TN LC layers 30, 60 have opposite handed twist. For example the first layer 30 may have right handed twist and the second layer 60 left handed twist or vice versa. The rubbing directions of the liquid crystals in the first and second layers 30, 60 are preferably perpendicular to each other with a tolerance of plus or minus 3 degrees. These characteristics have been found to give an improved contrast for the display.

As the first TN LC layer 30 is controlled by electrodes and the second TN LC layer 60 has no electrodes, the first layer is sometimes referred to as the 'active layer' while the second layer may be referred to as the 'passive layer'.

Preferably, the first (front) 5 and second (back) 100 polarizers have axes of polarization (also known as axes of transmission) which are perpendicular to each other, as this helps to maintain a good dark state for the display.

In use, a backlight (not shown) transmits light through the second polarizer 100, second TN LC layer 60, and first TN LC layer 30 to the first polarizer 5. As will be appreciated by a person skilled in the art, the transmitted light is polarized by the second polarizer 100 and its polarization state is then modified by its passage through the second and first TN LC layers 60, 30 by an amount which depends on the twist angle of the liquid crystals in the first layer 30, which is controlled by the electrodes 20, 40. Light which has a polarization aligned with the polarization axis of the first polarizer pass through the first polarizer 5 to the front of the display. Thus, the intensity of light transmitted by the sub-pixel is controlled by the voltage between the electrodes 20, 40.

Figure 2:
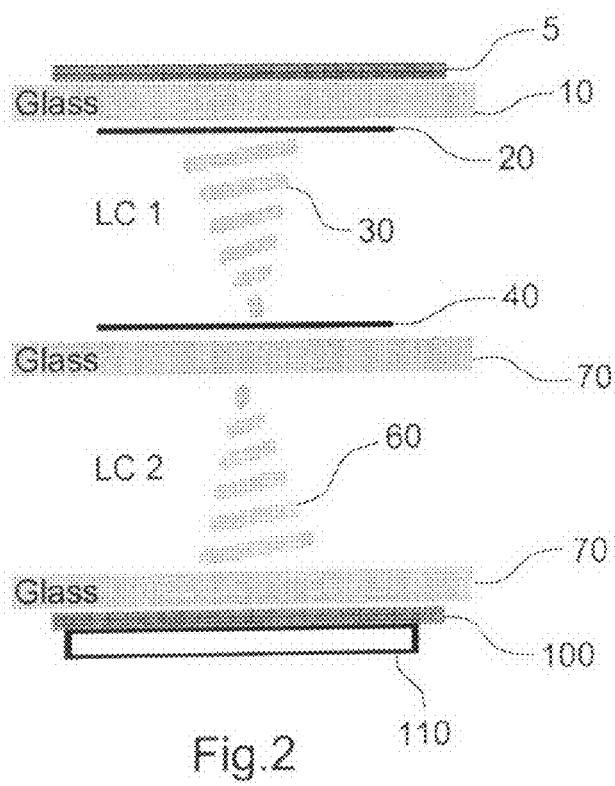
FIG. 2 shows the structure of a reflective sub-pixel of a transflective double cell twisted nematic LCD.

FIG. 2 shows a reflective sub-pixel and like reference numerals are used to denote the same parts as in FIG. 1. The two are very similar, so only the differences between the reflective sub-pixel of FIG. 2 and the transmissive sub-pixel of FIG. 1 will now be described. The reflective sub-pixel has a reflector 110 positioned behind the polarizer 100.

There is no-backlight for the reflective sub-pixel, or alternatively any light from the backlight is blocked from entering the reflective sub-pixel by the reflector 110.

In use, ambient light enters the reflective sub-pixel through first polarizer 5 and is linearly polarized along the axis of polarization of the first polarizer 5. The light then passes through first and second TN LC layers 30, 60 and the second polarizer 100 and is reflected by the reflector 110 so that it passes back through the first and second TN LC layers 30 and 60 and back to the first polarizer 5. The polarization of state of the light is modified by this journey and the exact change in polarization can be varied by changing the twist angle of the first TN LC layer by varying the voltage between the electrodes 20, 40. Light, which, after this journey, has a polarization, aligned with the polarization axis of the first polarizer passes through the first polarizer 5 to the front of the display.

The intensity of the reflected light leaving the reflective sub-pixel is thus controlled by the voltage between the electrodes 20, 40.

In the preferred embodiments, the transmissive and reflective sub-pixels will combine to form a single pixel with a single electrode potential. That is the electrodes 20, 40 of both transmissive and reflective sub-pixels share a common potential and are not independent of each other.

The thickness of the electrodes should be chosen to minimize their reflectance (which can seriously detract from the contrast of the reflective sub-pixel), while maintaining an acceptable electrode resistance (i.e. the resistance should not be too high). 130-135 nm is an example of one suitable thickness, but other thickness will be possible as will be apparent to a person skilled in the art.

Figure 3:
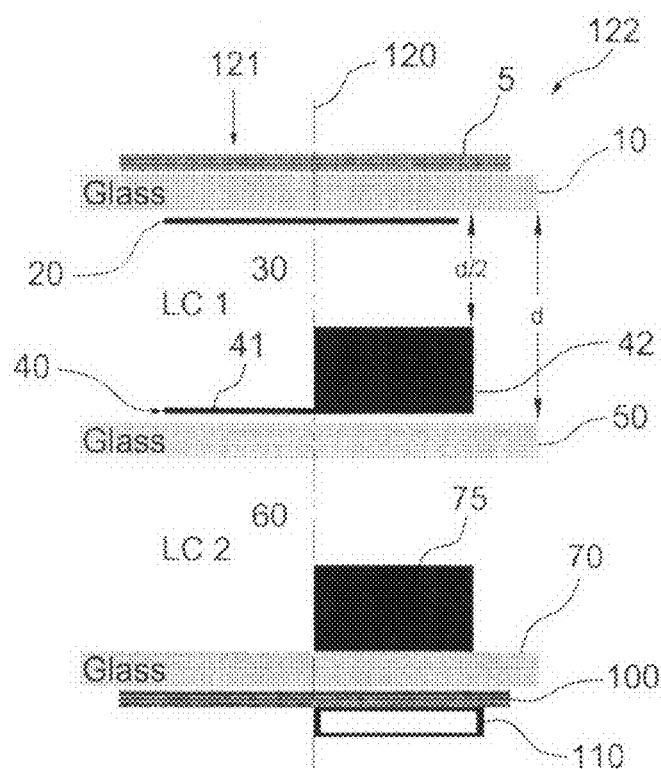
FIG. 3 shows a pixel of a transflective double cell twisted nematic LCD having a double cell gap arrangement.

FIG. 3 shows a pixel of a transflective double cell IN LCD, according to a first embodiment of the present invention, which employs a 'double cell gap'. The pixel comprises a transmissive region or sub-pixel 121 to the left of dashed line 120 and a reflective region or sub-pixel 122 to the right of dashed line 120. The pixel comprises first and second polarizers 5, 100, substrates 10, 50, 70, first and second TN LC layers 30, 60 and a reflector 110 as have been described for the sub-pixels above with reference to FIGS. 1 and 2.

It will be noted that the reflector 110 only extends across the reflective region, not the transmissive region, of the display.

The display is said to have a 'double cell gap' because, the thickness d of the first liquid crystal layer 30 in the reflective sub-pixel is half the thickness d/2 of the first liquid crystal layer 30 in the transmissive sub-pixel. Importantly, the same is true of the second liquid crystal layer: it is only half thickness in the reflective sub-pixel compared to the transmissive sub-pixel. This double cell gap arrangement keeps the electro-optical performance the same for both sub-pixels.

The reason is that light passing through the transmissive sub-pixel passes the liquid crystal layers 30, 60 only once, but light passing through the reflective sub-pixel passes through the layers twice because it is reflected. Therefore the double cell gap arrangement maintains the same phase retardation (due to passage through the TN LC layers) in both sub-pixels. Accordingly, the control voltage that provides maximum transmittance of the transmissive sub-pixel should also provide maximum reflectance of the reflective sub-pixel and thus brightness of the display can be maximized.

In the double cell gap arrangement the space which is not taken up by the TN liquid crystals in the reflective sub-pixel is preferably be taken up by a substantially transparent material. For example, the electrode 40 may be expanded in the reflective sub-pixel to take up the extra space (so as shown in FIG. 3 the electrode 40 has a thinner portion 41 in the transmissive region and a thicker portion 42 in the reflective region). Alternatively the front electrode 20 may be expanded in a similar manner, or both electrodes 20, 40 may be expanded. In the second liquid crystal layer a substantially transparent material 75 is coated on an inner surface of the substrate 70 (as shown in FIG. 3) in order to reduce the thickness of the second liquid crystal layer 60 in the reflective sub-pixel. The substantially transparent material 75 may be the same material as used to form electrode 40 (thus in effect forming an electrically unconnected electrode on the substrate 70). Alternatively the material 75 may be coated on an inner surface of substrate SO, or both substrates 50, 70.

Preferably the polarization axes of the first and second polarizers 5, 100 are perpendicular to each other. This helps the display to provide a black and white display image with a high contrast without giving rise to color, or a coloured image with high contrast.

Figure 4:
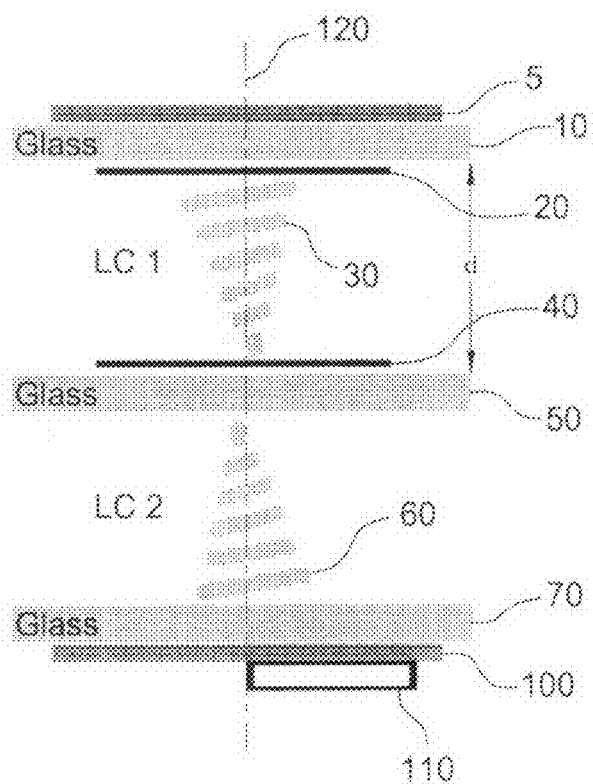
FIG. 4 shows a pixel of a transflective double cell twisted nematic LCD having a single cell gap arrangement.

FIG. 4 shows a second embodiment of the present invention. The second embodiment has the same configuration as the first embodiment except that it uses a single cell gap. By single cell gap, it is meant that the thickness of the liquid crystal layers 30, 60 is substantially the same in the reflective and transmissive sub-pixels; i.e. the thickness does not vary between the transmissive and reflective sub-pixels. Like reference numerals are used to denote the same parts as in the previously described figures.

In the embodiment of FIG. 4, since both light from the back light and ambient light follow basically the same path. This single cell gap arrangement can save costs since this scheme does not require a major extra component to form the discontinuous electrode (such as 41, 42 in FIG. 3), as a normal continuous electrode 40 is used. In the case of a double cell gap (as in FIG. 3), an extra thick inorganic layer (e.g. $SiO_2$) is required to form the double cell gap structure (the inorganic layer is between the substrates and the electrodes). Moreover, as the cell gap is the same, the response time of the reflective and transmissive sub-pixels in the single gap structure should be the same.

In some prior art single cell transflective LCDs there was a 'different color saturation' problem that once light had passed through the display it had a different color coordinate to the light source. The inventors have found that the 'different color saturation' problem that existed in some prior art single cell transflective LCDs (LCDs with only a single LC layer), does not appear (or is much reduced) in the double cell transflective LCD illustrated in FIGS. 3-5 and nor does it appear (or at least is much reduced) in the single cell arrangement of FIG. 6 which will be discussed later. One drawback of the configuration shown in FIG. 4 is that the change of phase retardation in the transmissive sub-pixel and the reflective sub-pixel is not the same. Therefore the normalized transmittance and reflectance are not matched.

Figure 5:
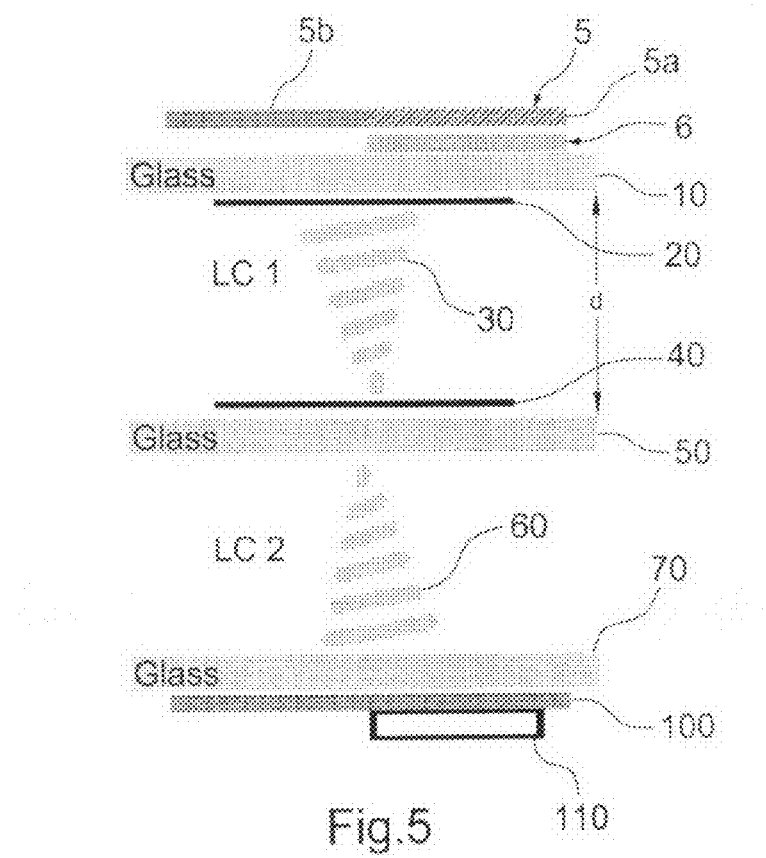
FIG. 5 shows a pixel of a transflective double cell twisted nematic LCD having a single cell gap arrangement and a patterned polarizer.

A third embodiment of the present invention, illustrated in FIG. 5, has been designed to overcome the above-mentioned transmittance and reflectance matching problem. The arrangement of FIG. 5 is similar to FIG. 4, and like reference numerals are used to denote like parts. The differences will now be described. The first polarizer 5 is patterned so that the part of the polarizer 5a extending over the transmissive sub-pixel has a different axis of polarization to the part of the polarizer 5b extending over the reflective sub-pixel. The differences between the axes of polarization of the two parts 5a and 5b are chosen such that the phase retardation between the two sub-pixels is matched such that the same control voltages can be used and transmission and reflectance efficiency maximized. Alternatively, the same effect could be achieved by patterning the rear polarizer 100 instead of the front polarizer 5.

As will be apparent to a person skilled in the art the polarization axes of the first and second parts 5a and 5b of the polarizer are chosen to match the transmittance versus voltage curve and the reflectance versus voltage curve.

Optionally, a patterned quarter wave retardation plate 6 can be inserted between the substrate 10 and the first polarizer 5. The patterned quarter wave retardation plate is patterned to act as a quarter wave retardation plate in the reflective sub-pixel and to let light pass without phase retardation in the transmissive sub-pixel. This has the effect of increasing the contrast of the reflective sub-pixel (which increased by quarter wave retardation), without adversely affecting the contrast of the transmissive sub-pixel (which would be reduced by quarter wave retardation).

An antireflective layer may provided at the front of the display, e.g. on top of the first polarizer 5. It provides a function of improving the contrast, by minimizing reflection in the dark state of the sub-pixel.

The refractive index of the anti-reflection layer is chosen so as to minimize reflection in the dark state of the pixel. The optimal refractive index of the AR layer can be found from the following equation:

$$\frac{n_0 - n_1}{n_0 + n_1} = \frac{n_1 - n_m}{n_1 + n_m}$$

where $n_0$ is the refractive index of air, $n_1$ is the refractive index of the anti-reflection layer and $n_m$ is the refractive index of the substrate 10 (e.g. glass).

This leads to $$n_1 = \sqrt{(n_0 n_m)}$$

And as the refractive index of air $n_0$ is 1, the refractive index of the antireflective layer should ideally be equal to the square root of the refractive index of the substrate material, e.g. the square root of the refractive of glass; which depends on the glass, but may be approximately 1.23. Currently there is no ideal material that has a sufficiently low refractive index and can be deposited in durable thin layers. Accordingly a multiple layer antireflective coating can be used. The antireflective layer may thus comprise two or more distinct layers of different materials having different refractive indexes.

In one preferred embodiment, illustrated in FIG. 14, the antireflective layer comprises three separate layers. A CeF3 layer 210 with a refractive index of 1.65 coated onto the substrate 10, a ZrO2 layer 220 with a refractive index of 2.10 coated on top of the $CeF_3$ layer, and a $MgF_2$ layer 230 with a refractive index of 1.38 coated on top of the $ZrO_2$ layer.

The thickness and the refractive index of the $CeF_3$, $ZrO_2$ and $MgF_2$ layers are 90 nm and 1.62; 260 nm and 2.1; and 100 nm and 1.38 respectively. These thicknesses may vary by plus or minus 20 nm.

Figure 6:
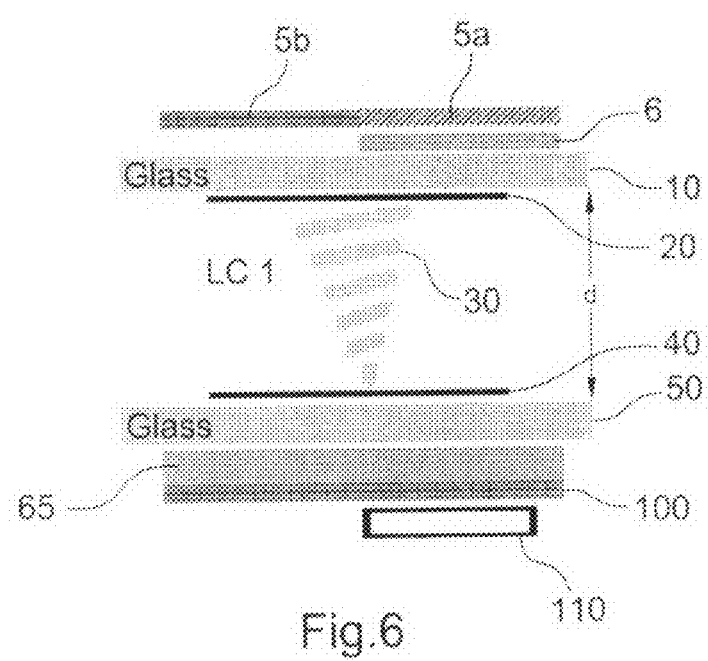
FIG. 6 shows a pixel of a transflective single cell twisted nematic LCD having a single cell gap arrangement, a patterned polarizer and a temperature dependent retardation film in place of the second LC cell.

A fourth embodiment of the present invention is illustrated in FIG. 6. The fourth embodiment is the same as the third embodiment, except as will now be described, and like reference numerals denote like parts as in the other figures.

In the fourth embodiment, the second liquid crystal layer 60 (and accompanying substrate 70) are replaced by a temperature dependent retardation film 65. The temperature dependent retardation film compensates the optical performance of twisted nematic panel over a wide range of temperature conditions and helps to improve the contrast of the display in a similar manner to the second liquid crystal layer 60, which is illustrated in the other embodiments. One advantage of this approach is that the thickness of the LCD is greatly reduced. However, the improvement in contrast, although good, is not quite as good as for the double cell approach.

FIG. 13 shows the structure of one possible temperature dependent retardation film which could be used with the present invention. The film 65 contains liquid crystals and has a twisted internal structure. It is based on a side-chain LC polymer, which is coated on the substrate 10. It provides a thin, lightweight, stable retarder.

FIG. 7 shows the directions of the polarization axes of the polarizers and rubbing directions of the TN LC layers in a transmissive sub-pixel, such as that shown in FIG. 1 or the left side of any one of FIGS. 3 to 5. The first polarizer 5 has a polarization axis (also known as a transmission axis) of 90 degrees, while the second polarizer 100 is crossed with the first polarizer 5 and has a polarizing axis (transmission axis) of 0 degrees. The first LC TN layer 30 has a rubbing direction of 135 degrees, while the second TN LC layer 60 has a rubbing direction of 45 degrees. As will be understood by a person skilled in the art, these particular angles are examples only and other angles would be possible. It is advantageous, although not essential, however, if the rubbing directions of the first and second TN LC layers are perpendicular to each other, as this may increase the contrast and possible viewing angles of the display.

FIG. 8 shows the directions of the polarization axes of the polarizers and rubbing directions of the TN LC layers in a reflective sub-pixel, such as that shown on the right side of FIGS. 3 and 4. The polarization axes and rubbing directions are the same as described above for FIG. 7. In addition there is a reflector 110 beneath the second polarizer 100. As will be understood by a person skilled in the art, these particular angles are examples only and other angles would be possible.

FIG. 9 shows the directions of the polarization axes of the polarizers and rubbing directions of the TN LC layers in a reflective sub-pixel with a patterned polarizer, such as that shown in FIG. 5. The polarization angles and rubbing directions are the same as for FIG. 8, except that there is a retarder 6, with a slow axis of 5 degrees between the first polarizer 5 and the first TN LC layer 30. Moreover, the first polarizer 5 has a transmission axis of 105 degrees, which is different to the polarization axis on the corresponding transmissive sub-pixel. As will be understood by a person skilled in the art, these particular angles are examples only and other angles would be possible.

A retardation film is usually a birefringent crystal with a carefully chosen thickness. The crystal is cut so that the extraordinary axis (polarized parallel to the axis of anisotropy) is parallel to the surfaces of the plate. When the extraordinary index is smaller than the ordinary (polarized perpendicularly to axis of anisotropy) index, as in calcite, the extraordinary axis is called the fast axis and the ordinary axis is called the slow axis. Light polarized along the fast axis propagates faster than light polarized along the slow axis.

FIG. 10 is a graph showing the transmittance vs controlling electrode voltage for a double cell transflective LCD which was constructed according to one embodiment of the present invention. There are four curves, for twist angles of 120, 90, 80 and 70 degrees respectively. As can be seen in the graph the steepness of the curve becomes lower for smaller twist angles, giving a better gray scale (i.e. finer control of the brightness of each pixel).

FIG. 11 is a table showing the color dispersion in a reflective sub-pixel of a transflective LCD according to one embodiment of the present invention, for sub-pixels with twist angles of 90 degrees, 80 degrees, 70 degrees, 60 degrees and 50 degrees. The values x and y refer to the color coordinates of the CIE1931 color diagram; Δx and Δy refer to the coordinate difference between the display color and the light source. As can be seen from the table, the color dispersion in the reflective sub-pixel is worse for smaller twist angles. Accordingly the inventors found that a twist of angle of 90 degrees gave a good compromise between the conflicting requirements of maximizing the gray-scale range and minimizing the color dispersion.

FIG. 12 is a table showing the difference in contrast ratios found in an experiment comparing the contrast ratio of reflective and transmissive double cell TN LC sub-pixels with single cell pixels made of the same materials. Column 5a) gives the contrast ratio found for a transmissive sub-pixel of a double cell TN LCD, 5b) for a reflective sub-pixel of a double cell TN LCD having a double cell gap, 5c) for a reflective sub-pixel of a double cell TN LCD having a single cell gap, 5d) to a transmissive single cell TN LCD and 5e) for a reflective single cell LCD. As can be seen the double cell arrangement approximately doubled the contrast for both reflective and transmissive sub-pixels.

The transflective liquid crystal displays according to the present invention may be especially advantageous when used for handheld and mobile communication devices, such as mobile telephones, personal digital assistants (PDA), e-books, etc. However, they are not limited to such devices and may be used in computer monitors and other less mobile display devices.

The invention claimed is:

1. A transflective liquid crystal display having at least one reflective region and at least one transmissive region, the display comprising:
    a first polarizer;
    a second polarizer opposing the first polarizer;
    two twisted nematic liquid crystal layers between the first and second polarizers; and
    a reflector configured to reflect light passing through the reflective region of the display;
    wherein the two twisted nematic liquid crystal layers have opposite twist directions to each other and at least one of the first and second polarizers is a patterned polarizer.

2. The transflective liquid crystal display of claim 1, wherein a first one of the twisted nematic liquid crystal layers is an active layer and a second one of the twisted nematic liquid crystal layers is a passive layer.

3. The transflective liquid crystal display of claim 1, wherein each of the twisted nematic liquid crystal layers has a respective twist angle, and wherein the twist angles of the two twisted nematic liquid crystal layers are substantially the same.

4. The transflective liquid crystal display of claim 1, wherein each of the twisted nematic liquid crystal layers has a respective twist angle and wherein the twist angles of the two twisted nematic liquid crystal layers are within the range from 50 degrees to 120 degrees.

5. The transflective liquid crystal display of claim 1, wherein each of the twisted nematic liquid crystal layers has a respective retardation value, and wherein the retardation values of the two twisted nematic liquid crystal layers differ by no more than 50 nm.

6. The transflective liquid crystal display of claim 1, wherein each of the twisted nematic liquid crystal layers has a respective rubbing direction, and wherein the rubbing directions of the two twisted nematic liquid crystal layers are at 87 to 93 degrees to each other.

7. The transflective liquid crystal display of claim 1, wherein the display has a single cell gap arrangement.

8. The transflective liquid crystal display of claim 1, wherein the liquid crystal layers are two times thicker in the transmissive regions of the display than in reflective regions of the display.

9. The transflective liquid crystal display of claim 1, wherein at least one of the patterned polarizers has different angles of polarizing axes in transmissive and reflective regions.

10. The transflective liquid crystal display of claim 1, wherein the patterned polarizer is the first polarizer and is positioned towards the front of the display.

11. The transflective liquid crystal display of claim 9, wherein the angles of polarizing axes in the transmissive and reflective regions are chosen to maintain the same electro-optical performance in the transmissive and reflective regions of the display.

12. The transflective liquid crystal display of claim 1, wherein a retarder is provided in the reflective regions of the display.

13. The transflective liquid crystal display of claim 12, wherein the retarder in the reflective regions is a quarter wave plate.

14. The transflective liquid crystal display of claim 12, wherein the retarder is positioned between the first polarizer and one of the two twisted nematic liquid crystal layers.

15. The transflective liquid crystal display of claim 1, wherein the display further comprises a patterned retarder.

16. A transflective liquid crystal display, comprising:
    at least one transmissive region and at least one reflective region;
    first and second polarizers opposing each other and spanning the regions;
    a first twisted nematic liquid crystal layer between the first and second polarizers; and
    a reflector configured to reflect light passing through the at least one reflective region;
    wherein one of the first and second polarizers has a first part overlying the transmissive region and a second part overlying the reflective region, the first and second parts having different polarization axes.

17. The transflective liquid crystal display of claim 16, further comprising a second twisted nematic LC layer between the first twisted nematic LC layer and the second polarizer, wherein the first and second twisted nematic LC layers have twist directions which are opposite to each other.

18. The transflective liquid crystal display of claim 17, wherein one of the twisted nematic LC layers is a retardation film comprising liquid crystals.

19. The transflective liquid crystal display of claim 17, wherein one of the twisted nematic LC layers is an active layer and the other is a passive layer fixed between two substrates.

20. A double cell twisted nematic transflective liquid crystal displays, comprising:
    two twisted nematic liquid crystal layers having a plurality of pixels, wherein one or more of the pixels are divided into reflective and transmissive sub-pixels; and
    two polarizers opposing each other, wherein the two twisted nematic liquid crystal layers are disposed between the two polarizers;
    wherein a first one of the two twisted nematic liquid crystal layers has an opposite twist direction to a second one of the two twisted nematic crystal layers and at least one of the two polarizers is a patterned polarizer.

21. The transflective liquid crystal display of claim 18, wherein the retardation film is a temperature dependent retardation film.

22. The liquid crystal display of claim 20, wherein the patterned polarizer has different angles of polarizing axes in transmissive and reflective regions.

23. The liquid crystal display of claim 20, wherein a temperature dependent retarder is provided in a reflective region of the display.

* * * * *